Patented Mar. 15, 1932

1,849,354

UNITED STATES PATENT OFFICE

ROBERT E. LESTER, OF BROOKLYN, NEW YORK, ASSIGNOR TO HERBERT C. BUGBIRD, OF NEW YORK, N. Y.

DUSTING POWDER AND THE LIKE

No Drawing.  Application filed December 9, 1927. Serial No. 239,006.

My present invention relates to so-called "dusting powders", by which I mean to designate powders used for dusting rubber and rubber compositions during their working, shaping and other mechanical operations and during the curing and other chemical treatments of such rubber and rubber compositions and the like. It is an object of the present invention to devise dusting powders for the general purposes designated above which may be readily and economically prepared; which are relatively inexpensive; and which are highly efficient in use, such dusting powders being characterized by their relatively high melting points, such melting points being preferably between the usual temperatures for mechanical working and the usual temperatures for the subsequent curing of the rubber and rubber compositions with which such dusting powders are intended to be employed; such dusting powders being characterized also by their having melting points above the melting points of the usual dusting powders, such as zinc stearate and the like, soluble in rubber and rubber compositions, these relatively high melting points being a very desirable feature since the dusting powders of the present invention are thus permitted to remain effective during the usual mechanical working operations, the melting points of the dusting powders of the present invention being, however, sufficiently below the temperatures at which curing takes place to be rendered molten and thus to become dissolved in the rubber or rubber compositions with which the same have been employed. My present invention also includes the method of working and curing rubber and rubber compositions with the use of the dusting powders of the present invention, such methods being characterized by their simplicity, economy, convenience and efficiency. Other objects of the present invention will in part be pointed out in detail hereinafter and will in part be obvious to those skilled in the art to which the present invention relates.

In the accompanying specification I shall describe several illustrative embodiments of the dusting powders of the present invention. In the accompanying specification I shall also describe several forms of methods for utilizing such dusting powders. It is, however, to be clearly understood that my invention is not limited to the specific embodiments thereof herein described for purposes of illustration only. It is also to be clearly understood that the dusting powders of the present invention are not restricted to their use in accordance with the forms of the methods herein described by way of illustration merely, nor are such methods necessarily restricted to their use with the specific dusting powder compositions herein described for purposes of illustration only.

Before describing the aforesaid illustrative embodiments of the methods and compositions of the present invention, it may be desirable briefly to outline the prior art relating to the field of the present invention. Hitherto dusting powders employed in the mechanical working and in the chemical curing of rubber have been of two kinds. The first kind is a mineral substance, such as pulverized talc or soapstone, insoluble in rubber and rubber compositions. Accordingly if such a rubber-insoluble dusting substance has been employed as a dusting powder, it remains permanently on the surface of the rubber mass, thus preventing or at least retarding the proper union of the rubber mass and also giving the same a dusty mineral appearance which is undesirable and which the manufacturer would like to avoid.

The second kind of dusting powder hitherto employed in the mechanical working and chemical curing of rubber and rubber compositions has been zinc stearate. While this substance is soluble in rubber, it has a relatively low melting point, about 233° F., which is below the usual working operations required to render the mass of rubber or rubber compositions plastic, so that the zinc stearate melts and to a great extent is thus prevented from exercising its function as a proper dusting powder.

I have discovered that a certain class of substances, comprising one or more of the fatty acid salts of one or more of the alkaline earth metals, are not only readily soluble in rubber and the usual rubber compositions, but also have melting points which conveniently lie intermediate the usual mechanical working temperatures required to render the mass of rubber or rubber compositions plastic, that is, between about 240° or 260° or 275° F., and the usual curing temperatures, which are in the neighborhood of 300° or 305°, as 303°, F.

Accordingly, the dusting powders of the character just described remain unfused and thus are permitted to exercise efficiently their function as true dusting powders during the mechanical working operations at the usual temperatures required to render the rubber or rubber compositions plastic, while readily dissolving in the rubber or rubber compositions at the higher temperatures generally employed for curing the mass of rubber or rubber composition. In other words, the substances referred to are ideally suited by reason of their melting points and their solubility in rubber and the usual rubber compositions, and also by reason of the state of fine mechanical composition to which they readily adapt themselves, to serve as dusting powders in the mechanical working and chemical curing of rubber and rubber compositions.

As already stated, I may employ for the purpose of the present invention one or more fatty acid salts, such as the stearate or the palmitate, or mixtures of the stearate and palmitate, of one or more of the alkaline earth metals, such as magnesium, calcium or barium. I may also employ mixtures containing one or more of the oleates of the alkaline earth metals designated, care being taken to avoid too much of the oleates which have lower melting points and which would thus tend to lower the melting point of the final mixture below the desired minimum temperature.

It may here be stated that the melting of magnesium stearate is about 275° F., while the melting point of calcium stearate is about 285° F. and barium stearate has a melting point still higher, namely, about 297° F. For this reason, I prefer to employ barium stearate. Barium stearate has the further advantage that it is relatively heavy and thus tends to adhere more completely to the surface of the rubber or rubber composition on which it is dusted. Furthermore, it may be readily and economically obtained with a very high yield amounting to almost one hundred per cent. (100%) of the theoretical yield by treating a solution of soft soap, such as a soda soap, for example, a mixture of sodium stearate and palmitate, obtained, for example, by treating double or single pressed stearic acid containing the usual percentages of palmitic acid with caustic soda in the usual manner. The barium stearate, containing also the barium palmitate and also traces of barium oleate, is thus precipitated and may be washed in a filter press, dried, pulverized and screened. It will be found that the material is precipitated in a substantially molecular condition due to the method of its manufacture.

It will be found that the barium stearate, with or without its admixtures of certain percentages of barium palmitate and a preferably still smaller percentage of barium oleate, is not only soluble in the usual rubber and rubber compositions, but is also soluble in other hydrocarbons, such as benzol and the like. It may therefore be employed in the working and curing of rubber and rubber compositions in the form of a solution in benzol or other hydrocarbon solvent. Moreover, the barium compounds of the fatty acids described above and particularly barium stearate are found to exercise a very beneficial influence on the rubber compositions with which the same are employed, acting as softeners for such rubber compositions.

Finally, it will be found that the barium stearate, with or without the admixtures of barium palmitate and barium oleate referred to above, serves as an ideal dusting powder during the mechanical working operations of the mass of rubber or rubber composition, dissolving readily in such mass during the curing operation, the melting point of the dusting powder being within the range of melting points ideally suited for the designated purposes. Thus, while the dusting powders of the present invention prevent the rubber compositions from adhering to the tools and other portions of the apparatus which are employed for the mechanical working operations, they dissolve in such compositions during the curing operation and thus permit the joints between the different portions of the cured rubber mass to be strong and hardly distinguishable from the unitary mass of the rubber composition itself.

This completes the description of the aforesaid illustrative embodiment of the methods of the present invention. The composition of the dusting powders of the present invention and the method for their production, as well as their advantages and superiorities in use, have been made clear above. Similarly, the method of using such compositions by which the mechanical working operation takes place at a temperature below the melting point of the dusting powder in accordance with the principles of the present invention, while such melting point is below the temperature at which the curing operation is effected, thus permitting the dusting powder to fulfill its proper function in a most efficient manner during the mechanical operation and to dissolve in the rubber during the curing operation, which latter is thus accelerated, and with other beneficial effects on the rubber composition, have likewise been made clear in the foregoing description. Other advantages and superiorities of the compositions of the present invention and of the methods for utilizing the same in the treatment of rubber and rubber compositions will readily occur to those skilled in the art to which the present invention relates.

It may here be stated that while it possesses a relatively high specific gravity, due to its extremely fine state of subdivision, amounting almost to a molecularly fine state of powder so that a considerable surface of rubber composition may be successfully dusted with a given unit of weight of the powder. It may here further be stated that one of the principal advantages of the dusting powders of the present invention is that the same facilitate the union of rubber surfaces to which they have been applied, as in the case of laminated products or products made of several component parts of rubber, rubber composition or rubberized fabrics or the like, due to the solvent action of such powders when melted on the surfaces with which they come into contact.

What I claim as my invention is:

1. The method of working a mass of rubber or rubber compositions, which comprises mechanically working the mass at a predetermined temperature in the presence of a dusting powder comprising a fatty acid salt of an alkaline earth metal having a melting point above said predetermined temperature for mechanical working and thereafter curing the mechanically worked mass at a temperature above the temperature of the melting point of said dusting powder.

2. The method of working a mass of rubber or rubber compositions, which comprises mechanically working the mass at a predetermined temperature in the presence of a dusting powder comprising a fatty acid salt of an alkaline earth metal insoluble in said mass and having a melting point above said predetermined temperature for mechanical working and thereafter curing the mechanically worked mass at a temperature above the temperature of the melting point of said dusting powder.

3. The method of working a mass of rubber or rubber compositions, which comprises mechanically working the mass at a predetermined temperature in the presence of a dusting powder comprising an alkaline earth stearate having a melting point above said predetermined temperature for mechanical working and thereafter curing the mechanically worked mass at a temperature above the temperature of the melting point of said dusting powder.

4. The method of working a mass of rubber or rubber compositions, which comprises mechanically working the mass at a predetermined temperature in the presence of a dusting powder comprising a mixture of alkaline earth stearate and palmitate having a melting point above said predetermined temperature for mechanical working and thereafter curing the mechanically worked mass at a temperature above the temperature of the melting point of said dusting powder.

5. The method of working a mass of rubber or rubber compositions, which comprises mechanically working the mass at a predetermined temperature in the presence of a dusting powder comprising a mixture of barium stearate and palmitate having a melting point above said predetermined temperature for mechanical working and thereafter curing the mechanically worked mass at a temperature above the temperature of the melting point of said dusting powder.

6. The method of preparing a mixture of rubber or rubber compositions for subsequent curing, which consists of mechanically working the same in the presence of an alkaline earth metal salt of a higher fatty acid.

7. The method of preparing a mixture of rubber or rubber compositions for subsequent curing, which consists of mechanically working the same in the presence of a mixture of alkaline earth metal salts of the higher fatty acids.

8. The method of preparing a mixture of rubber or rubber compositions for subsequent curing, which consists of mechanically working the same in the presence of a mixture of barium stearate and palmitate.

9. The method of preparing a mixture of rubber or rubber compositions for subsequent curing, which consists of mechanically working the same in the presence of barium stearate.

10. As an article of manufacture, cured rubber or rubber compositions containing barium stearate, said barium stearate having been used in the mechanical working of said rubber and not having interfered with the curing of the aforesaid rubber.

In testimony whereof, I have signed my name to this specification this 1st day of December, 1927.

ROBERT E. LESTER.